United States Patent
Wu et al.

(10) Patent No.: US 9,479,261 B2
(45) Date of Patent: Oct. 25, 2016

(54) SYSTEM AND METHOD FOR MITIGATING FOUR-WAVE-MIXING EFFECTS

(71) Applicant: Cisco Technology, Inc., San Jose, CA (US)

(72) Inventors: Kuang-Yi Wu, Bolingbrook, IL (US); Mary R. Phillips, Chicago, IL (US); Fred S. Hirt, La Porte, IN (US)

(73) Assignee: Cisco Technology, Inc., San Jose, CA (US)

( * ) Notice: Subject to any disclaimer, the term of this patent is extended or adjusted under 35 U.S.C. 154(b) by 193 days.

(21) Appl. No.: 14/064,831

(22) Filed: Oct. 28, 2013

(65) Prior Publication Data

US 2014/0050480 A1    Feb. 20, 2014

Related U.S. Application Data

(63) Continuation of application No. 13/086,219, filed on Apr. 13, 2011, now Pat. No. 8,571,417.

(51) Int. Cl.
*H04J 14/02* (2006.01)
*H04B 10/00* (2013.01)
*H04B 10/12* (2006.01)
*H04B 10/548* (2013.01)
*H04B 10/2563* (2013.01)

(52) U.S. Cl.
CPC ........ *H04B 10/548* (2013.01); *H04B 10/2563* (2013.01); *H04J 14/02* (2013.01); *H04J 14/0298* (2013.01)

(58) Field of Classification Search
CPC ............ H04B 10/548; H04B 10/2563; H04B 10/2507; H04B 10/18; G02F 1/3536; G02F 1/3538; H04J 14/02; H04J 14/0298

USPC .............................. 398/79, 185, 81, 200, 188
See application file for complete search history.

(56) References Cited

U.S. PATENT DOCUMENTS

| | | | | |
|---|---|---|---|---|
| 5,119,710 A | * | 6/1992 | Tsurumi | G10H 1/0058 84/600 |
| 5,192,824 A | * | 3/1993 | Shibukawa | G10H 1/18 84/615 |
| 5,329,396 A | | 7/1994 | Fishman et al. | |

(Continued)

OTHER PUBLICATIONS

Brophy, Tim, Villarruel, Fernando; and Wy, Kuang-yi; "Delicate Balance: Alternatives for Multi-Wavelength Systems," Communications Technology, vol. 25, No. 1, pp. 33-37, Jan. 1, 2008.
Phillips, Mary R.; Wu, Kuang-yi; Villarruel, Fernando; "Four-Wave-Mixing-Induced Crosstalk and Distortion in Subcarrier-Multiplexed Lightwave Links: Theory and Measurement," Journal of Lightwave Technology, vol. 26, No. 15, pp. 2647-2652, 2008.

(Continued)

*Primary Examiner* — Ken N Vanderpuye
*Assistant Examiner* — Abbas H. Alagheband
(74) *Attorney, Agent, or Firm* — Baker Botts L.L.P.

(57) ABSTRACT

In one embodiment, a system includes at least one tone generator, a first transmitter, and a second transmitter. The at least one tone generator is operable to generate a plurality of modulation tones comprising at least a first modulation tone having a first tone frequency and a second modulation tone having a second tone frequency that is different from the first tone frequency. The first transmitter is operable to apply the first modulation tone to a first optical signal such that at least a portion of the first optical signal is divided into one or more sidebands. The second transmitter is operable to apply the second modulation tone to a second optical signal such that at least a portion of the second optical signal is divided into one or more sidebands.

19 Claims, 9 Drawing Sheets

(56) References Cited

U.S. PATENT DOCUMENTS

| | | | | |
|---|---|---|---|---|
| 5,386,314 A * | 1/1995 | Jopson | G02F 1/397 | 359/326 |
| 5,477,368 A * | 12/1995 | Eskildsen | H04B 10/2537 | 359/334 |
| 5,677,504 A * | 10/1997 | Kurata | G10H 1/183 | 84/603 |
| 5,809,196 A * | 9/1998 | Meli | G02B 6/02271 | 359/615 |
| 5,828,477 A * | 10/1998 | Nilsson | H04B 10/2537 | 398/185 |
| 5,841,557 A * | 11/1998 | Otsuka | H04B 10/2557 | 398/152 |
| 5,920,588 A * | 7/1999 | Watanabe | H01S 5/50 | 372/106 |
| 5,946,117 A * | 8/1999 | Meli | H04B 10/25077 | 385/122 |
| 5,991,061 A * | 11/1999 | Adams | H01S 5/06258 | 372/96 |
| 6,011,638 A * | 1/2000 | Mamyshev | G02B 6/02247 | 385/123 |
| 6,014,479 A * | 1/2000 | Darcie | H04B 10/2525 | 372/9 |
| 6,118,563 A * | 9/2000 | Boskovic | H04B 10/2563 | 398/1 |
| 6,166,837 A * | 12/2000 | Adams | H01S 5/06258 | 359/249 |
| 6,282,003 B1 * | 8/2001 | Logan, Jr. | H04B 10/2537 | 398/158 |
| 6,331,908 B1 * | 12/2001 | Adams | H04B 10/2537 | 372/50.11 |
| 6,366,376 B1 * | 4/2002 | Miyata | H04J 14/0224 | 398/79 |
| 6,490,071 B2 | 12/2002 | Logan, Jr. et al. | | |
| 6,516,010 B1 | 2/2003 | Broutin et al. | | |
| 6,519,079 B1 * | 2/2003 | Grochocinski | H01S 3/302 | 359/334 |
| 6,594,048 B1 * | 7/2003 | Song | H04B 10/2563 | 398/44 |
| 6,606,178 B1 * | 8/2003 | Rhee | H04B 10/2563 | 398/158 |
| 6,646,786 B1 * | 11/2003 | Meli | H01S 3/302 | 359/334 |
| 6,674,557 B1 * | 1/2004 | DaSilva | H04B 10/2525 | 398/79 |
| 6,788,833 B1 * | 9/2004 | Brisson | H04B 10/2543 | 385/1 |
| 6,879,433 B1 * | 4/2005 | Yamashita | G02F 1/3536 | 359/326 |
| 6,940,624 B1 * | 9/2005 | Sardesai | H04J 14/0224 | 398/79 |
| 7,020,402 B2 * | 3/2006 | Shanbhag | H04J 14/02 | 398/158 |
| 7,146,110 B2 | 12/2006 | Frederiksen et al. | | |
| 7,277,645 B2 * | 10/2007 | Gill | H04B 10/2563 | 398/185 |
| 7,447,436 B2 * | 11/2008 | Yee | H04B 10/50 | 398/152 |
| 7,466,882 B2 * | 12/2008 | Kish, Jr. | B82Y 20/00 | 385/24 |
| 7,697,580 B2 * | 4/2010 | Smith | B82Y 20/00 | 372/29.011 |
| 7,783,197 B2 | 8/2010 | Litvin et al. | | |
| 7,936,997 B2 * | 5/2011 | Ramachandran | H04B 10/25751 | 398/192 |
| 8,401,398 B2 * | 3/2013 | Robinson | H04B 10/5051 | 398/183 |
| 8,451,528 B1 * | 5/2013 | Kuo | G02F 1/07 | 359/264 |
| 8,467,676 B2 * | 6/2013 | Villarruel | H04B 10/032 | 398/10 |
| 8,537,452 B2 * | 9/2013 | Kanter | G02F 1/3536 | 359/278 |
| 2002/0097469 A1 * | 7/2002 | Yee | H04B 10/2507 | 398/76 |
| 2002/0167417 A1 * | 11/2002 | Welles, II | G01S 1/725 | 340/8.1 |
| 2002/0168138 A1 * | 11/2002 | Leclerc | H04B 10/2525 | 385/24 |
| 2004/0208623 A1 * | 10/2004 | Kumar | H04J 14/08 | 398/161 |
| 2004/0218920 A1 * | 11/2004 | Piotte | H04B 10/00 | 398/32 |
| 2004/0257642 A1 * | 12/2004 | Fishman | H04B 10/0777 | 359/341.3 |
| 2005/0058462 A1 * | 3/2005 | Talebpour | H04B 10/508 | 398/199 |
| 2005/0084202 A1 * | 4/2005 | Smith | B82Y 20/00 | 385/14 |
| 2005/0152025 A1 * | 7/2005 | Hainberger | H04B 10/2916 | 359/334 |
| 2006/0198636 A1 * | 9/2006 | Charlet | H04J 14/02 | 398/83 |
| 2006/0291868 A1 * | 12/2006 | Yee | H04B 10/50 | 398/152 |
| 2007/0012860 A1 * | 1/2007 | Mahgerefteh | H01S 5/0687 | 250/205 |
| 2007/0133993 A1 * | 6/2007 | Yee | H04B 10/50 | 398/85 |
| 2007/0140704 A1 * | 6/2007 | Mauro | H04B 10/2537 | 398/188 |
| 2008/0273874 A1 * | 11/2008 | Ramachandran | H04B 10/25751 | 398/43 |
| 2008/0292316 A1 * | 11/2008 | Litvin | H04J 14/0224 | 398/79 |
| 2009/0097850 A1 * | 4/2009 | Frisken | G02B 6/29311 | 398/81 |
| 2009/0129778 A1 | 5/2009 | Phillips et al. | | |
| 2009/0208214 A1 * | 8/2009 | Hauenschild | H04B 10/50 | 398/78 |
| 2009/0226172 A1 * | 9/2009 | Larikova | H04J 14/0205 | 398/83 |
| 2009/0290879 A1 * | 11/2009 | Schemmann | H04B 10/2537 | 398/81 |
| 2010/0021166 A1 * | 1/2010 | Way | H04J 14/02 | 398/79 |
| 2010/0104277 A1 * | 4/2010 | Robinson | H04B 10/5051 | 398/25 |
| 2010/0183294 A1 * | 7/2010 | Villarruel | H04B 10/032 | 398/10 |
| 2010/0239258 A1 * | 9/2010 | Calabretta | H04B 10/677 | 398/70 |
| 2011/0063711 A1 * | 3/2011 | Kanter | G02F 1/3536 | 359/278 |
| 2011/0116800 A1 * | 5/2011 | Wei | H04B 10/2531 | 398/81 |
| 2011/0150484 A1 * | 6/2011 | Wang | H04B 10/2537 | 398/115 |
| 2012/0095711 A1 * | 4/2012 | Foster | G06E 3/003 | 702/67 |
| 2012/0263474 A1 * | 10/2012 | Huang | H04B 10/25754 | 398/93 |

OTHER PUBLICATIONS

Forghieri, F.; Tkach. R.W.; and Chraplyvy, A.R.; "WDM Systems with Unequally Spaced Channels," Journal of Lightwave Technology, vol. 13, No. 5, pp. 889-897, 1995.

Forghieri, F.; Tkach. R.W.; and Chraplyvy, A.R.; Chapter 8, "Fiber Nonlinearities and their impact on Transmission Systems," in Optical Fiber Telecommunications, IIIA, edited by Kaminow and Koch, Academic, 1997.

Chung, U.C.; Jeong, J.; and Cheng, L.S.; "Aging-induced Wavelength Shifts in 1.5μm DFB Lasers," IEEE Photonics Technology Letters, vol. 6, No. 7, pp. 792-795, 1994.

Inoue, Kyo; "Reduction of Fiber Four-Wave Mixing Influence Using Frequency Modulation in Multichannel IM/DD Transmission" IEEE Log No. 9204004, 1992.

* cited by examiner

SYSTEM AND METHOD FOR MITIGATING FOUR-WAVE-MIXING EFFECTS

CROSS-REFERENCE TO RELATED APPLICATION

This application is a continuation of U.S. application Ser. No. 13/086,219 filed Apr. 13, 2011 and entitled "System and Method for Mitigating Four-Wave-Mixing Effects".

TECHNICAL FIELD

The present disclosure relates generally to optical networking, and more specifically to a system and method for mitigating four-wave-mixing effects.

BACKGROUND

Fiber-optic communication may involve transmitting information from one place to another by sending optical signals through an optical fiber. An optical fiber may include any material that facilitates transmission of optical signals, such as an optical waveguide. An optical signal may form an electromagnetic carrier wave modulated to carry information.

DESCRIPTION OF EXAMPLE EMBODIMENTS

Overview

Figure 1:
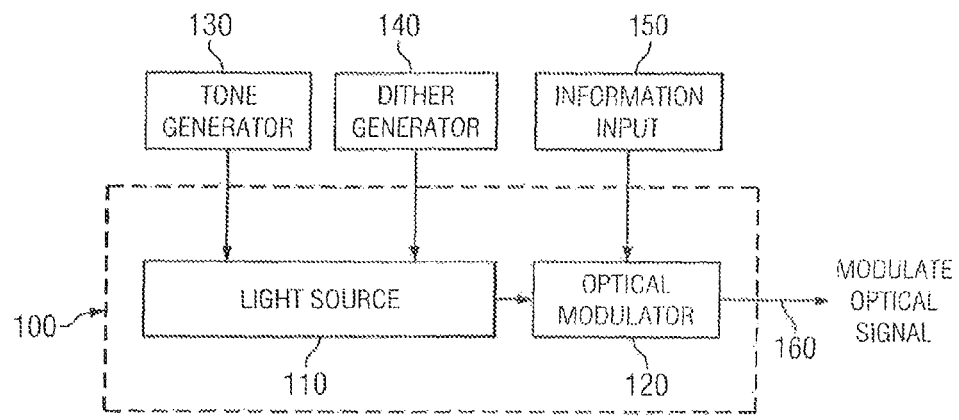
FIG. 1 illustrates an example transmitter for transporting signals over a fiber optic network.

In one embodiment, a system includes at least one tone generator, a first transmitter, and a second transmitter. The at least one tone generator is operable to generate a plurality of modulation tones comprising at least a first modulation tone having a first tone frequency and a second modulation tone having a second tone frequency that is different from the first tone frequency. The first transmitter is operable to apply the first modulation tone to a first optical signal such that at least a portion of the first optical signal is divided into one or more sidebands. The second transmitter is operable to apply the second modulation tone to a second optical signal such that at least a portion of the second optical signal is divided into one or more sidebands.

Description

Fiber-optic communication may involve transmitting information from one place to another by sending optical signals through an optical fiber. An optical fiber may include any material that facilitates transmission of optical signals, such as an optical waveguide. An optical signal may form an electromagnetic carrier wave modulated to carry information. The process of communicating using fiber optics may include creating the optical signal using a transmitter, relaying the optical signal along the fiber, and converting the optical signal into an electrical signal.

In a wavelength-division-multiplexing (WDM) architecture, signals are carried by multiple colors of light (different optical wavelengths) within the same optical fiber so that transmission bandwidth can be increased without necessarily deploying new fiber. A WDM system uses a multiplexer at the transmitter to join signals together and a demultiplexer at the receiver to split the signals apart. Dense wavelength division multiplexing (DWDM) may use the same channel window as WDM but with denser channel spacing.

A channel window is a band of wavelengths that may contain one or more optical signals, or channels. Examples of channel windows may include, but are not limited to, the original band ("O band"), ranging from 1260 to 1360 nanometers; the extended band ("E band"), ranging from 1360 to 1460 nanometers; the short band ("S band"), ranging from 1460 to 1530 nanometers; the conventional band ("C band"), ranging from 1530 to 1565 nanometers; the long band ("L band"), ranging from 1565 to 1625 nanometers; and the ultralong band ("U band"), ranging from 1625 to 1675 nanometers.

In some circumstances, the optical signal may become weak or distorted during transmission through the fiber. For example, nonlinearities exist that may affect how information is transmitted through a fiber. These nonlinearities may include stimulated Raman scattering (SRS), cross-phase modulation (XPM), four wave mixing (FWM), and stimulated Brillouin scattering (SBS).

The SRS effect may cause optical energy to be transferred between a pair of optical channels. Within the erbium-doped fiber amplifier (EDIFA) spectrum, crosstalk may increase as the separation between two optical signal channels increases. The SRS crosstalk degrades composite-second-order (CSO) distortion of the analog channels and modulation error rate (MER) of the quadrature amplitude modulation (QAM) channels. At a given link loss budget, the SRS effect my limit how wide the channel window can be and how many channels can be carried within the channel window.

The XPM effect occurs when the optical index of fiber experienced by one signal wavelength is modulated by the intensity fluctuation of another wavelength. When two optical channels are too close to each other, XPM may impose crosstalk at high signal frequency QAM band and result in MER or even bit error rate (BER) degradation. XPM crosstalk may confine itself in multiple service operator (MSO) distribution networks with 100 GHz channel spacing.

FWM may occur when multiple wavelengths travel in the same direction in the fiber, producing new wavelengths as a result of fiber properties. These new wavelengths, referred to as FWM products, raise two primary concerns: the location of the FWM products and their power. The power of FWM products depends on both the power in generating the optical wavelengths and on how well the optical wavelengths stay phase matched. The closer the optical wavelengths are to the zero dispersion wavelength (the wavelength at which there is no dispersion in the fiber), the more easily they stay phase matched. In standard single mode fiber, the zero dispersion point may be around 1311 nanometers, but may vary anywhere from 1301 to 1321 nanometers in some circumstances.

The location of the FWM products may be determined by calculating the frequency of the FWM products as a function of the frequencies of the contributing signals. For example, the frequency of FWM products generated from two optical channels may be equal to:

$$f_{fwm} = 2 \cdot f_1 - f_2$$

The frequency of FWM products generated from three optical channels may be equal to:

$$f_{fwm} = f_1 + f_2 - f_3$$

In some circumstances, the FWM effect may produce FWM products that land near the optical channels. For example, if a fiber is carrying four optical channels numbered 1-4, the FWM products resulting from channels 2 and 3 may have frequencies near channels 1 and 4.

The SBS nonlinearity results from interactions of light waves (photon) and sound (phonon) in the fiber. Without an SBS remedy, the maximum fiber launch power per wavelength may be around 6 to 7 dBm in some circumstances.

Two examples of SBS remedies are dither signals and modulation tones. Dither signals may be applied to a laser transmitter to broaden the effective linewidth of the laser. Dithering signals may be applied, for example, by modulating the laser transmitter's bias input. Although the finite linewidth of the laser, which is a function of the fixed physical characteristics of the laser, may actually remain constant, the dithering of the laser bias current may cause the wavelength of the laser's output signal to be cyclically shifted about the natural output wavelength produced by the un-dithered laser. This effectively spreads the output linewidth over a range centered about the un-dithered output. Dithering the laser transmitter's optical center frequency may allow the power limit to be increased.

Modulation tones may divide optical signal into one or more sidebands. Examples of modulation tones may include phase modulation tones and amplitude modulation tones. In some embodiments, modulation tones may suppress SBS effects. For example, the sidebands resulting from application of modulation tones may be sufficiently separate to have independent power thresholds at which SBS interference occurs. By distributing the optical signal across one or more sidebands, the overall power transmitted across the optical fiber can be increased without producing deleterious interference. Interference may include effects from distortions, carriers, spurious products, noise, and other effects. Modulation tones that suppress SBS effects may also be known as SBS suppression tones.

In some embodiments, the frequency of modulation tones may be considerably higher than the frequency of dither signals. For example, in some embodiments, modulation tones may have a frequency higher than the frequency of the information band carried by the optical channels, and dither tones may have a frequency lower than the frequency of the information band carried by the optical channels. For example, modulation tones may have a frequency equal to or higher than double the frequency of the optical channels in some embodiments, whereas dither signals may have a frequency in the audio frequency band (e.g., approximately between 30 Hz to 20 KHz).

The presence of modulation tones, however, may result in additional FWM products. If these FWM products fall between 1 to 5 GHz from the signal wavelength, the 2 GHz and 4 GHz and other harmonics may fold the optical beating noise back to the 1 GHz CATV band, and therefore impose carrier-to-noise ratio (CNR) and MER degradation onto RF channels. Teachings of certain embodiments recognize the capability to reduce the ability of FWM products of modulation tones to interfere with the optical signal channels.

FIG. 1 illustrates an example transmitter 100 for transporting signals over a fiber optic network. Transmitter 100 comprises a laser source 110 and an optical modulator 120. In operation, according to one embodiment, transmitter 100 may receive signals from tone generator 130, dither generator 140, and information input 150 to produce a modulated optical signal 160.

Light source 110 may include any device capable of generating and/or transmitting light. Examples of light source 110 may include, but are not limited to, light-emitting diodes and laser diodes. Examples of laser diode light sources may include, but are not limited to, a vertical cavity surface emitting laser and a distributed feed back laser.

Optical modulator 120 may include any device capable of modulating the light output of light source 110. Modulation may refer to the process of varying one or more properties of a carrier waveform with respect to a modulating signal. Examples of an optical modulator 120 may include, but are not limited to, an electro-optic modulator, an electro-absorption modulator, and a Mach-Zehnder interferometer.

Tone generator 130 may include any device capable of generating a modulation tone. Modulation tones may divide an optical signal into one or more sidebands. In some embodiments, these sidebands may be sufficiently separate to have independent power thresholds at which SBS interference occurs. By distributing the optical signal across one or more sidebands, the overall power transmitted across the optical fiber may be increased without producing deleterious interference.

Dither generator 140 may include any device capable of generating a dithering signal. The dithering signal broadens the light energy provided by light source 110. For example, if light source 110 is a laser, dither generator 140 may provide a dithering signal that spreads the linewidth of the light provided by light source 110. Dithering the laser's optical center frequency may allow the power limit to be increased.

Information input 150 may include any source of signals to be modulated into an optical signal. Examples of signals from information input 150 may include, but is not limited to, voice, data, and video signals. In one example embodiment, information input 150 provides radio frequency (RF) signals, such as RF signals representing cable television channels.

In operation, according to one embodiment, light source 110 may generate or transmit electromagnetic energy. Tone generator 130 may introduce a modulation tone to the electromagnetic energy to divide the electromagnetic signal into one or more sidebands. Dither generator 140 may introduce a dithering signal that spreads the effective linewidth of the electromagnetic signal provided by light source 110. Optical modulator 120 may modulate the electromagnetic signal provided by light source 110 with respect to information signals provided by information input 150.

Optical modulator 120 transmits the modulated electromagnetic signal as modulated optical signal 160.

Figure 2:
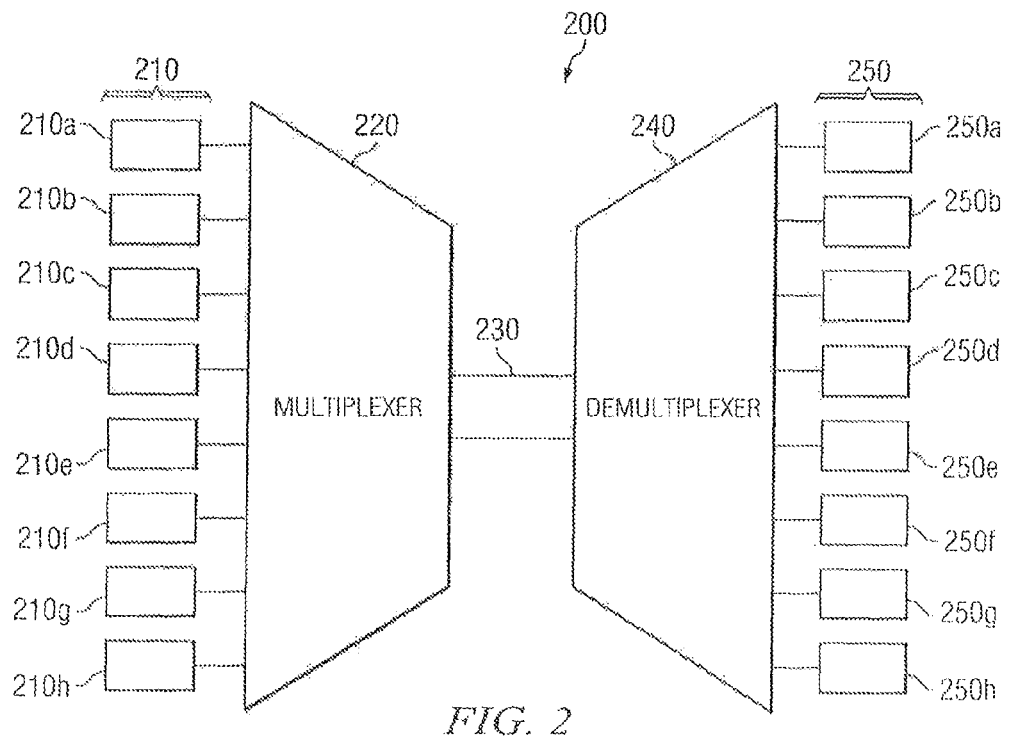
FIG. 2 illustrates an example system for transporting signals over a fiber optic network.

FIG. 2 illustrates an example system 200 for transporting signals over a fiber optic network. System 200 comprises transmitters 210, a wavelength multiplexer 220, an optical fiber 230, a wavelength de-multiplexer 240, and receivers 250.

Transmitters 210 may include any device capable of generating or transmitting modulated optical signals. One example of a transmitter 210 may include transmitter 100 of FIG. 1. For example, transmitters 210 may receive signals from a tone generator such as tone generator 130, a dither generator such as dither generator 140, and an information input such as information input 150. Transmitters 210 may also generate modulated optical signals such as modulated optical signal 160.

In some embodiments, each transmitter 210 provides different modulated optical signals. For example, each modulated optical signal may represent a different channel with a different carrier frequency. In the example of FIG. 2, eight transmitters 210a-210h provide eight different modulated optical signals to wavelength multiplexer 220. Different embodiments of system 200 may include more or fewer transmitters 210. Transmitters 210 may carry the same or different information.

Wavelength multiplexer 220 may include any device capable of multiplexing optical carrier signals into a single optical fiber 230 by using different wavelengths of laser light. Wavelength multiplexer 220 has inputs corresponding to each transmitter 210 and at least one output corresponding to optical fiber 230. The outputs of transmitters 210 are operatively connected with respect to one of the inputs of wavelength multiplexer 220. The output of wavelength multiplexer 220 is configured to transmit a combined optical signal comprised of the transmitter optical signals having respective transmitted power levels. In some embodiments, wavelength multiplexer 220 can be implemented by a cascade of multiplexers, each with more or fewer inputs than needed.

Optical fiber 230 may include any material that facilitates transmission of optical signals, such as an optical waveguide. Although FIG. 2 shows one optical fiber 230 between wavelength multiplexer 220 and wavelength de-multiplexer 240, system 200 may also include numerous discrete passive and active components such as fiber optic cable, terminations, splitters, amplifiers, WDMs, etc. In some embodiments, optical fiber 230 may be part of a hybrid-fiber coaxial (HFC) network.

Wavelength de-multiplexer 240 may include any device capable of demultiplexing multiple optical carrier signals from optical fiber 230. Wavelength de-multiplexer 240 may have at least one input corresponding to optical fiber 230 and outputs corresponding to each receiver 250. The output of optical fiber 230 is operatively connected with respect to the input of wavelength de-multiplexer 240. The outputs of wavelength de-multiplexer 240 are configured to transmit optical signals to each of receivers 250. In some embodiments, wavelength de-multiplexer 240 can be implemented by a cascade of demultiplexers, each with more or fewer outputs than needed. Receivers 250 may include any device capable of receiving modulated optical signals from wavelength de-multiplexer 240.

In operation, according to one embodiment, each transmitter 210 provides a modulated optical signal to wavelength multiplexer 220. Wavelength multiplexer 220 multiplexes the modulated optical signals into single optical fiber 230 by using different wavelengths of laser light. The modulated optical signals travel through single optical fiber 230 to wavelength de-multiplexer 240. Wavelength de-multiplexer 240 demultiplexes the modulated optical signals from optical fiber 230 and transmits them to receivers 250.

Figure 3:
FIG. 3 illustrates a table containing an example set of frequency variables for the system of FIG. 2.

FIG. 3 illustrates a table 300 containing an example set of frequency variables for system 200. Table 300 lists frequencies for channels A-H corresponding to transmitters 210a-210h of FIG. 2. Each channel may be characterized by a channel frequency (v), a modulation tone frequency (f), and a dither frequency (d). Selection of each channel frequency, modulation frequency, and/or dither frequency may affect the existence and impact of nonlinearities such as SRS, XPM, FWM, and SBS.

Figure 4:
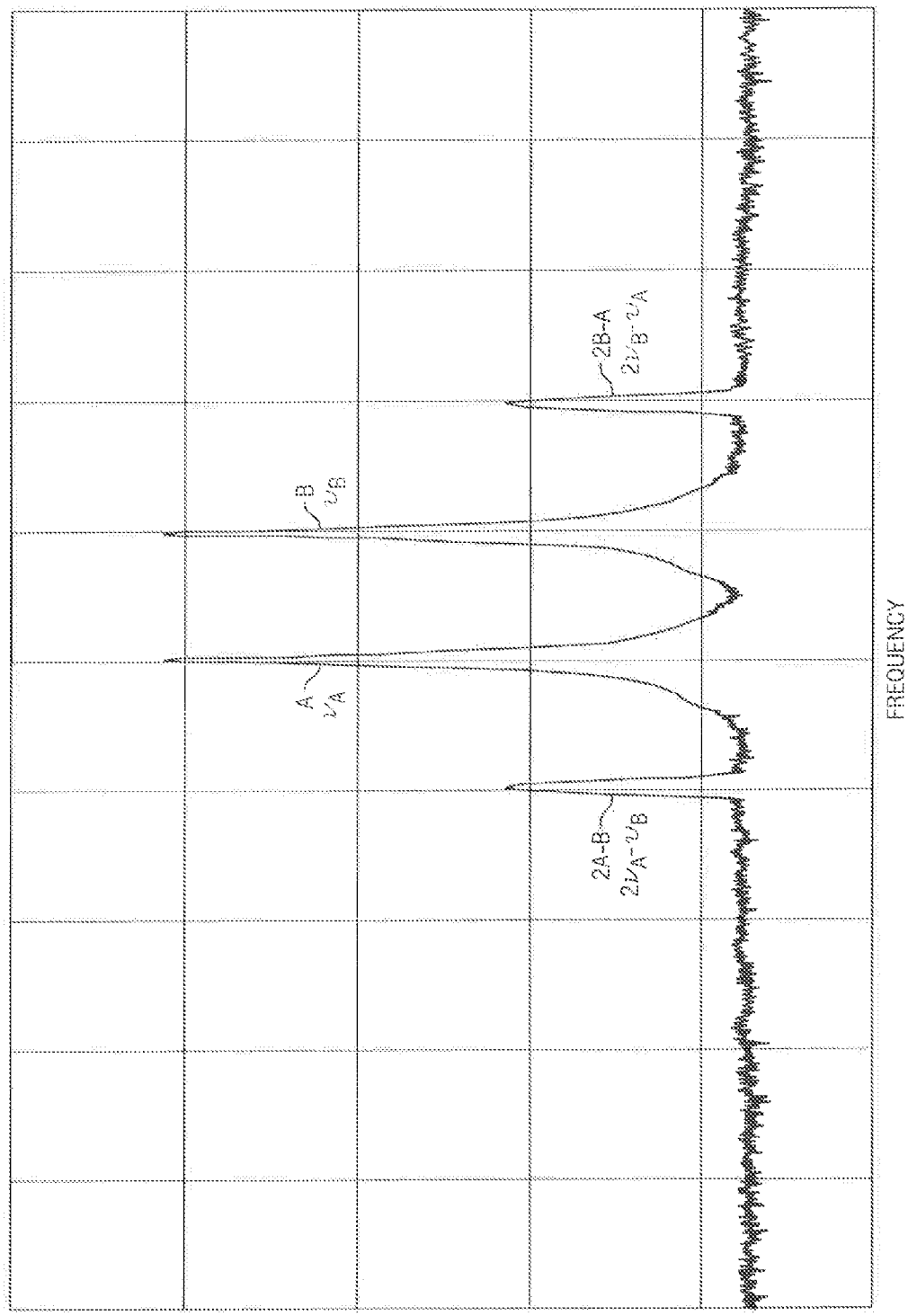
FIG. 4 illustrates an example plot of two optical signals and their FWM products.

As one example, selection of each channel frequency may affect the location of FWM products. FIG. 4 illustrates an example plot 400 of two optical signals and their FWM products. In this example, channels A and 13 have FWM products with frequencies equal to $2v_A-v_B$ and $2v_B-v_A$. As shown in plot 400, the difference between $v_A$ and $v_B$ is approximately equal to the difference between $v_A$ and $2v_A-v_B$ and to the difference between $v_B$ and $2v_B-v_A$.

In some examples, channels A-H may be equally spaced. For example, the difference between $v_A$ and $v_B$ for adjacent channels A and B may be approximately equal to the distance between between $v_B$ and $v_C$ for adjacent channels B and C. If so, then FWM product $2v_B-v_A$ may be near or equal to $v_C$ for channel C, which may result in interference in channel C. As another example, a FWM product may have a frequency equal to $v_A+v_C-v_B$, which may be near or equal to $v_B$ for channel B and result in interference in channel B.

Accordingly, teachings of certain embodiments recognize the ability to select channel frequencies such that the channels are unequally spaced. In some embodiments, all channels may be unequally spaced. In other embodiments, only some channels are unequally spaced. For example, in some embodiments channels A-H may be organized into subsets such as subset A-D and subset E-H. In this example, all the channels within subset A-D may be unequally spaced and all the channels within subset E-H may be unequally spaced. In one example embodiment, the difference between channels $v_A$ and $v_B$ may be equal to the difference between channels $v_E$ and $v_F$, the difference between $v_B$ and $v_C$ may be equal to the difference between $v_F$ and $v_G$, and the difference between $v_C$ and $v_D$ may be equal to the difference between $v_G$ and $v_H$.

Figure 5:
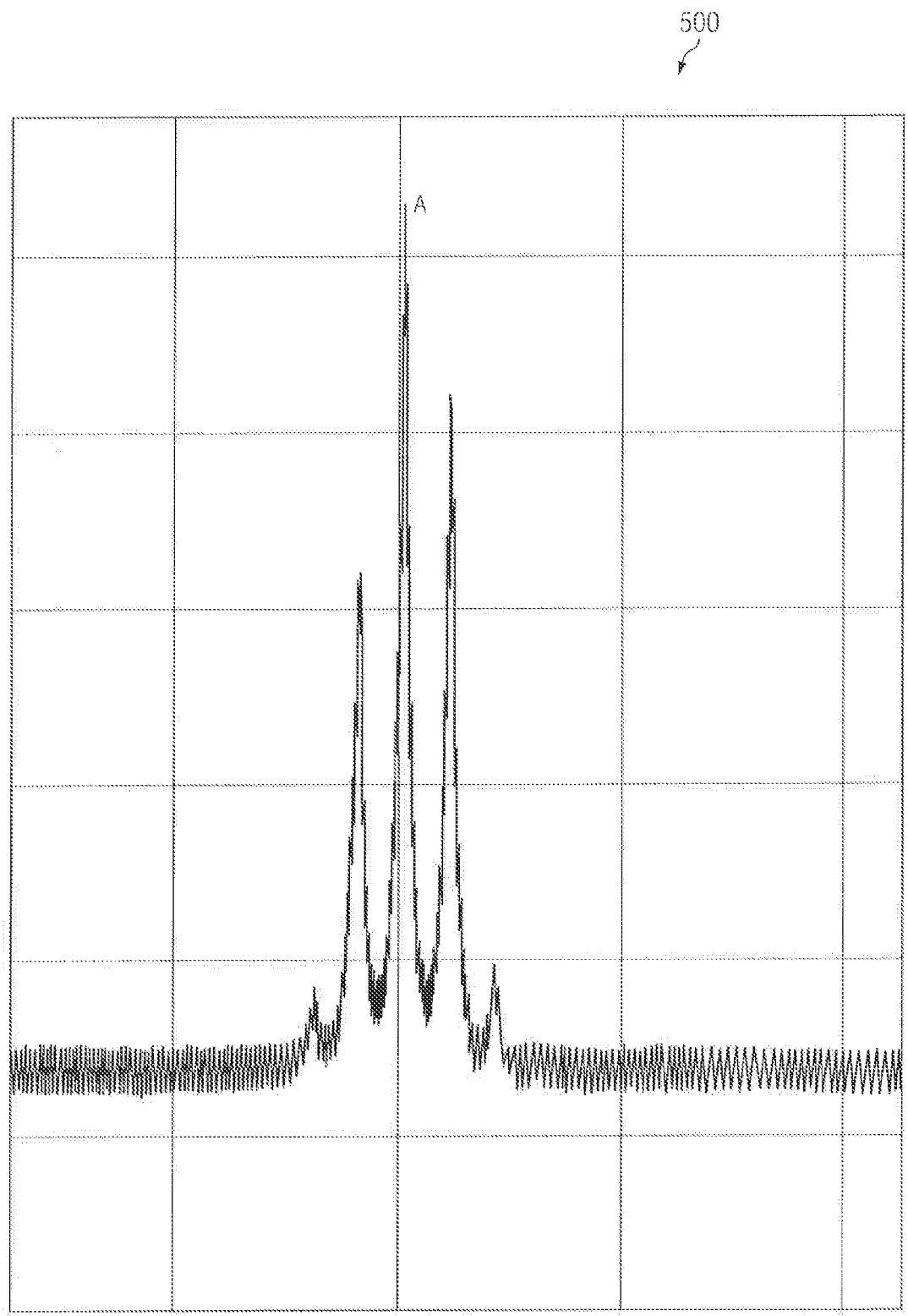
FIG. 5 illustrates an example plot of an optical signal after a phase modulation tone has been applied.

As another example of how selection of frequencies may affect the existence and impact of nonlinearities, the introduction of modulation tones may allow the overall power transmitted across the optical fiber to be increased. FIG. 5 illustrates an example plot 500 of an optical spectrum after a modulation tone has been applied. In this example, applying a modulation tone to channel A has resulted in multiple sidebands. The spacing of each sideband may be based on the frequency of the modulation tone. For example, applying a modulation tone of 2.00 GHz may result in sidebands offset at ±2 GHz, ±4 GHz, ±6 GHz, etc.

In plot 500, the sidebands at ±2 GHz are almost as powerful as the primary signal, the sidebands at ±4 GHz are less powerful, and the power of the sidebands at ±6 GHz is insignificant. The number of significant sidebands may affect FWM crosstalk. For example, consider a configuration of system 200 where FWM products are 25 GHz away from channel C, but each of channels A-H has significant sidebands to ±6 GHz. This may result in FWM products of the sidebands at 1 GHz away from the 6 GHz sideband of channel B. With aging and temperature variation, transmitters 210 may shift in frequency such that the FWM products of the sidebands shift even closer to channel B and impair the signal of channel B.

Accordingly, teachings of certain embodiments recognize the capability to set the modulation tones at different frequencies on different channels. For example, the frequencies of the modulation tones $f_A$, $f_B$, and $f_C$ for channels A, B, and C may be set at 1.975, 2.000, and 2.025 GHz respectively, instead of setting all of them to 2.000 GHz. In this example, FWM crosstalk may still fall near 1 GHz but may be spread out over a range of frequencies (e.g., 900 MHz to 1100 MHz) such that the power spectral density is reduced. Teachings of certain embodiments recognize that reducing the power spectral density may reduce FWM crosstalk power in the information signal pass band.

In some embodiments, every modulation tone may have a different frequency. In other embodiments, some modulation tones may remain the same. For example, in one embodiment, adjacent channels may have modulation tones of different frequencies, whereas non-adjacent channels may have modulation tones of the same frequency. For example, the frequency of the modulation tone for channel A may be different from channel B but the same as channel C, and the frequency of the modulation tone for channel B may be different from channel C but the same as channel D.

In another example embodiment, the modulation tone frequencies may be different for every channel within a subset of channels. For example, in some embodiments channels A-H may be organized into subsets such as subset A-D and subset E-H. In this example, all the channels within subset A-D may have modulation tones of different frequencies, and all modulation tones within subset E-F may have modulation tones of different frequencies. In one example embodiment, channels A and E may have modulation tones of the same frequency, B and F may have modulation tones of the same frequency, C and G may have modulation tones of the same frequency, and D and H may have modulation tones of the same frequency. In another example embodiment, channels A and E may have modulation tones of the same frequency, B and G may have modulation tones of the same frequency, D and H may have modulation tones of the same frequency, and C and F may have modulation tones of different frequencies.

Figure 6A:
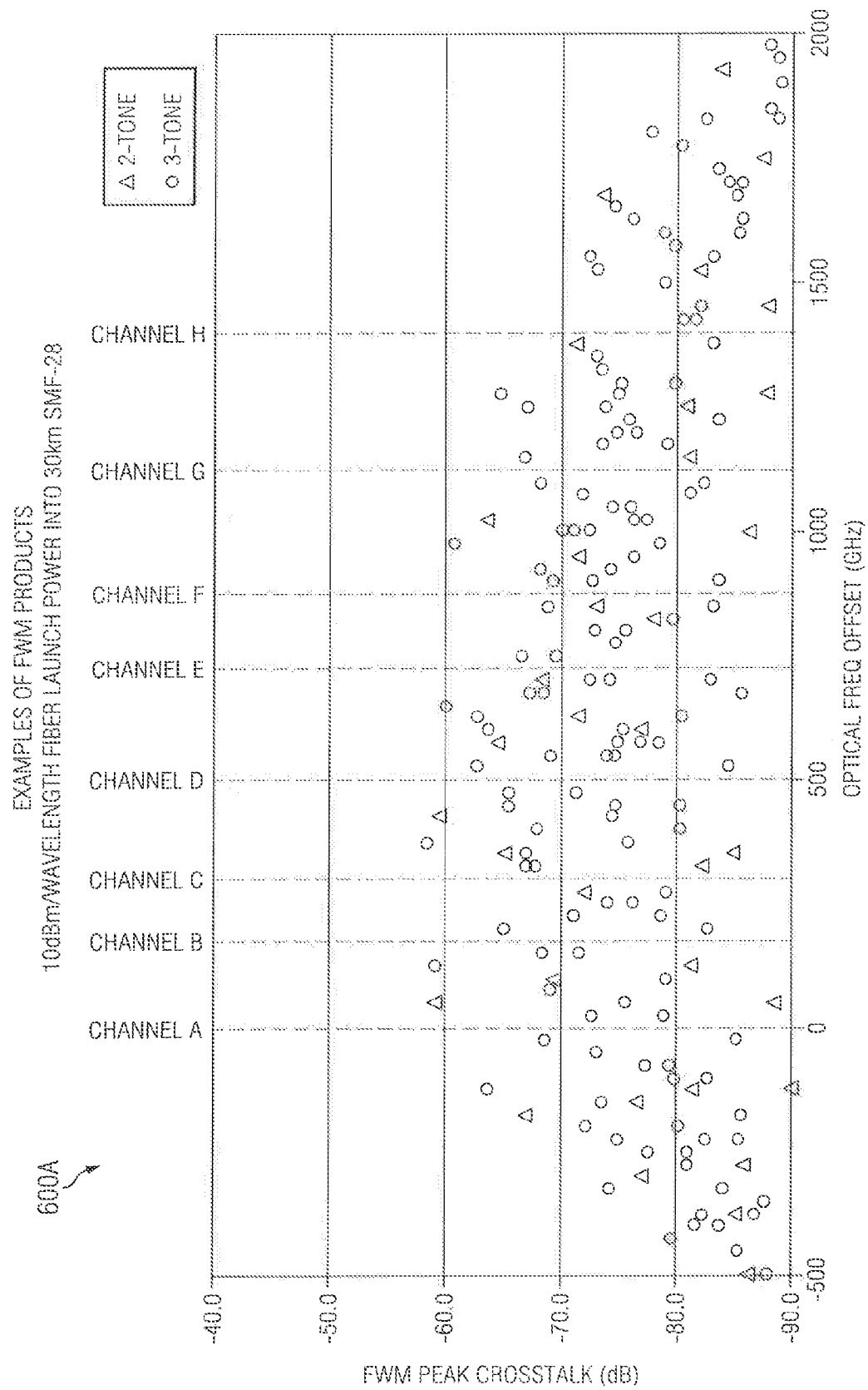
FIG. 6A shows an example plot of channels A-H and their four-wave mixing products according to one embodiment.

In some embodiments, modulation tone frequencies may be selected based on the relationship between channels and their FWM products. FIG. 6A shows an example plot 600A of channels A-H and their four-wave mixing products according to one embodiment. In plot 600A, no modulation tones have been applied to channels A-H.

In plot 600A, the origin of the x-axis is defined as the frequency of channel A, and all other frequencies are measured along the x-axis as being offset from channel A. For example, in plot 600A, channels B-H are defined in relation to channel A as shown in Table 1, below:

| Channel | Frequency |
| --- | --- |
| A | $v_A$ |
| B | $v_A$ + 175 GHz |
| C | $v_A$ + 300 GHz |
| D | $v_A$ + 500 GHz |
| E | $v_A$ + 725 GHz |
| F | $v_A$ + 875 GHz |
| G | $v_A$ + 1125 GHz |
| H | $v_A$ + 1400 GHz |

Transmitting channels A-H through an optical network may result in both two-tone and three-tone FWM products. Two-tone FWM products include those FWM products receiving contributions from two channels. The frequency of a two-tone FWM product may be equal to $2v_2-v_1$. Three-tone FWM products include those FWM products receiving contributions from three channels. The frequency of a three-tone FWM product may be equal to $v_1+v_3-v_2$.

Figure 6B:
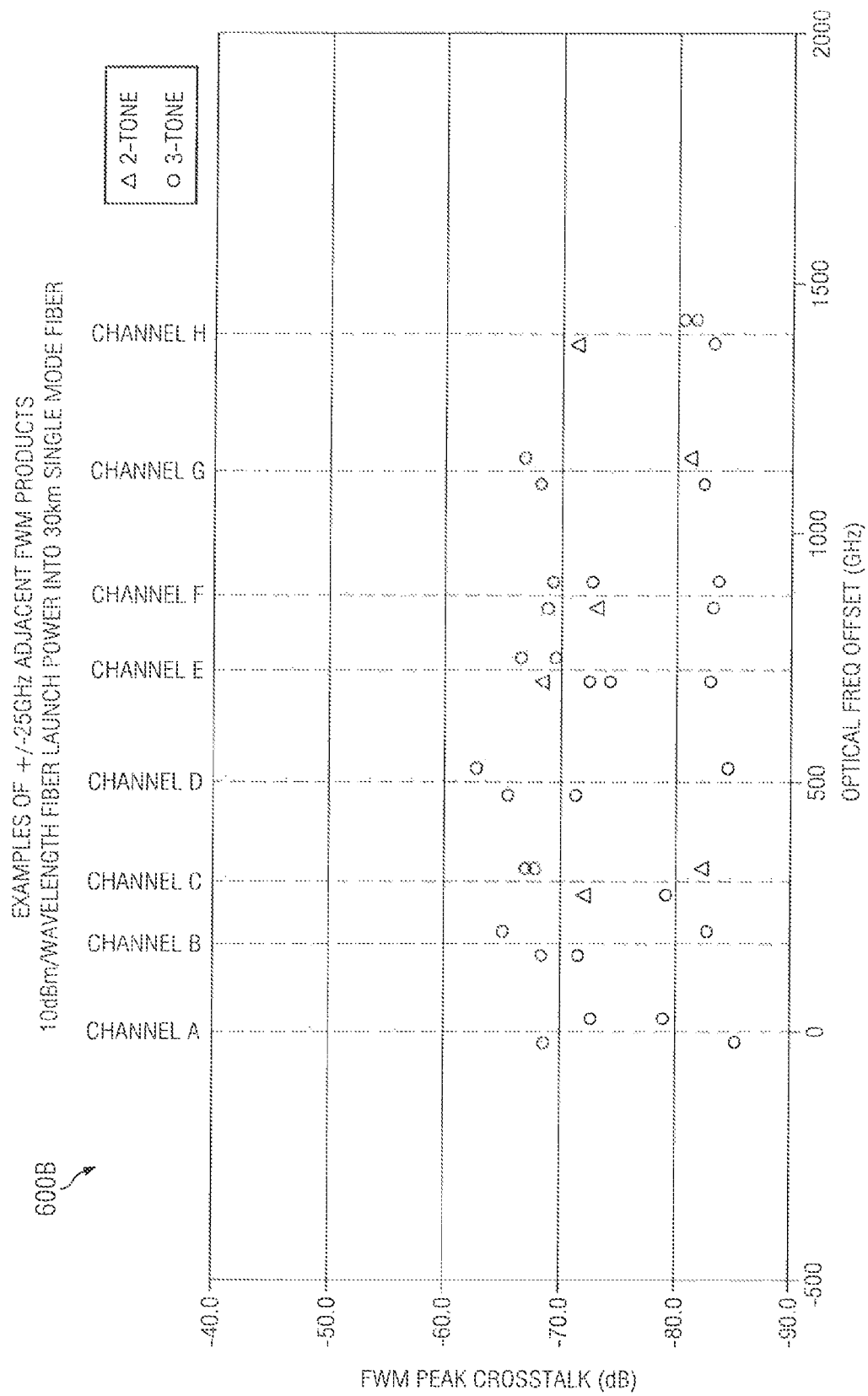
FIG. 6B shows an example plot of the channels A-H of FIG. 6A and their four-wave mixing products that are have frequencies within 25 GHz of channels A-H according to one embodiment.

In the example of plot 600A, the frequencies of channels A-H are defined such that FWM products are generally no closer than 25 GHz away from a channel. As transmitters age, channels A-H may experience wavelength drifting and result in shifts on the wavelength of some FWM products. In these circumstances, those FWM products closest to the channels will be among the most likely FWM products to drift into the optical channel and result in interference. FIG. 6B shows an example plot 600B of the channels A-H of FIG. 6A and their four-wave mixing products that are have frequencies within 25 GHz of channels A-H according to one embodiment.

Teachings of certain embodiments recognize the capability to apply modulation tones to channels A-H so as to reduce the ability of a FWM product near an optical channel to interfere with that optical channel. In one example embodiment, modulation tones are applied such that, for at least some two-tone FWM products closest to the optical channels, the channels contributing to the two-tone FWM products and the channels closest to the two-tone FWM products have modulation tones of different frequencies. For example, Table 2, below, lists the two-tone FWM products, the channels contributing to the two-tone FWM products, the channels closest to the two-tone FWM products, and the crosstalk power of the two-tone FWM products.

| Channel 2 ($v_2$) | Channel 1 ($v_1$) | Two-tone FWM Product Frequency ($2v_2 - v_1$) | Channel Closest to FWM Product | FWM Crosstalk (dB) |
| --- | --- | --- | --- | --- |
| D | C | $v_A$ + 700 GHz | E | −68.4 |
| D | E | $v_A$ + 275 GHz | C | −71.9 |
| E | C | $v_A$ + 1150 GHz | G | −81.2 |
| E | G | $v_A$ + 325 GHz | C | −82.2 |
| G | F | $v_A$ + 1375 GHz | H | −71.3 |
| G | H | $v_A$ + 850 GHz | F | −73.0 |

In this example, modulation tone frequencies may be selected such that channels C, D, and E all have modulation tones of different frequencies; channels C, E, and G all have modulation tones of different frequencies; and channels F, G, and H all have modulation tones of different frequencies. Such an arrangement may be accomplished by applying five different modulation tones to channels A-H, as listed below in Table 3.

| Modulation Tone | Channel | Example Value |
| --- | --- | --- |
| 1 | C | $f_1$ |
| 2 | D, H | $f_1$ + 28 MHz |
| 3 | A, E | $f_1$ + 58 MHz |
| 4 | B, G | $f_1$ + 88 MHz |
| 5 | F | $f_1$ + 118 MHz |

The modulation tones of Table 3 may be used, for example, in an optical networking configuration that only supports a range of modulation tones that is 130 MHz or less. Although additional modulation tones may fit within the supported range, teachings of certain embodiments recognize that maintaining spacing between the different modulation tone frequencies may help reduce the ability FWM products near optical channels to interfere with the optical channels. For example, in some embodiments, dither generator 140 may increase the laser linewidth by 20-30 MHz, and the frequencies of the modulation tones may be separated to account for dithering of the laser linewidth.

In another example embodiment, modulation tones are applied such that, for at least some three-tone FWM products closest to the optical channels, the channels contributing to the three-tone FWM products and the channels closest to the three-tone FWM products have modulation tones of different frequencies. For example, Table 4, below, lists the three-tone FWM products, the channels contributing to the three-tone FWM products, the channels closest to the three-tone FWM products, and the crosstalk power of the three-tone FWM products.

| Channel 1 ($v_1$) | Channel 3 ($v_3$) | Channel 2 ($v_2$) | Three-tone FWM Product Frequency ($v_1 + v_3 - v_2$) | Channel Closest to FWM Product | FWM Crosstalk (dB) |
|---|---|---|---|---|---|
| A | D | B | $v_A$ + 325 GHz | C | −67.1 |
| A | D | C | $v_A$ + 200 GHz | B | −65.0 |
| A | F | B | $v_A$ + 700 GHz | E | −72.3 |
| A | F | E | $v_A$ + 150 GHz | B | −71.6 |
| A | H | C | $v_A$ + 1100 GHz | G | −82.1 |
| A | H | D | $v_A$ + 900 GHz | F | −83.5 |
| A | H | F | $v_A$ + 525 GHz | D | −84.6 |
| A | H | G | $v_A$ + 275 GHz | C | −79.1 |
| B | C | A | $v_A$ + 475 GHz | D | −65.4 |
| B | C | D | $v_A$ + −25 GHz | A | −68.6 |
| B | E | A | $v_A$ + 900 GHz | F | −72.6 |
| B | E | F | $v_A$ + 25 GHz | A | −72.5 |
| B | F | C | $v_A$ + 750 GHz | E | −66.5 |
| B | F | E | $v_A$ + 325 GHz | C | −67.8 |
| B | H | E | $v_A$ + 850 GHz | F | −83.0 |
| B | H | F | $v_A$ + 700 GHz | E | −83.0 |
| C | E | B | $v_A$ + 850 GHz | F | −68.7 |
| C | E | D | $v_A$ + 525 GHz | D | −62.7 |
| C | E | F | $v_A$ + 150 GHz | B | −68.2 |
| C | G | A | $v_A$ + 1425 GHz | H | −80.7 |
| C | G | E | $v_A$ + 700 GHz | E | −74.1 |
| C | G | H | $v_A$ + 25 GHz | A | −78.9 |
| D | F | A | $v_A$ + 1375 GHz | H | −83.2 |
| D | F | H | $v_A$ + −25 GHz | A | −85.2 |
| D | G | E | $v_A$ + 900 GHz | F | −69.2 |
| D | G | F | $v_A$ + 750 GHz | E | −69.5 |
| E | F | B | $v_A$ + 1425 GHz | H | −81.5 |
| E | F | D | $v_A$ + 1100 GHz | G | −68.1 |
| E | F | G | $v_A$ + 475 GHz | D | −71.2 |
| E | F | H | $v_A$ + 200 GHz | B | −82.7 |
| F | H | G | $v_A$ + 1150 GHz | G | −66.8 |

Applying the modulation tones of Table 3 to channels A-H may result in most, but not all, of the three-tone FWM products listed in Table 4 having three contributing channels and a closest channel with four different modulation tones. For example, as shown in Table 4, FWM of channels A, D, and B results in a three-tone FWM product having a frequency of $v_A$+325 GHz that is near channel C. Applying the modulation tones of Table 3 to channels A, D, B, and C results in all four channels having modulation tones of different frequencies.

Applying the modulation tones of Table 3 to channels A-H may result in 11 of the FWM products listed in Table 4 having three contributing channels and a closest channel, two of which share a modulation tone frequency. For example, as shown in Table 4, FWM of channels A, F, and B results in a three-tone FWM product having a frequency of $v_A$+700 GHz that is near channel E. Applying the modulation tones of Table 3 to channels A, F, B, and E results in channels A and E sharing the same modulation tone frequency. Even if this scenario, however, applying different modulation tone frequencies to channels A, F, and B may still reduce the ability of the resulting FWM product having a frequency of $v_A$+700 GHz to interfere with channel E even though channels A and E may share the same modulation tone frequency.

Figure 7A:
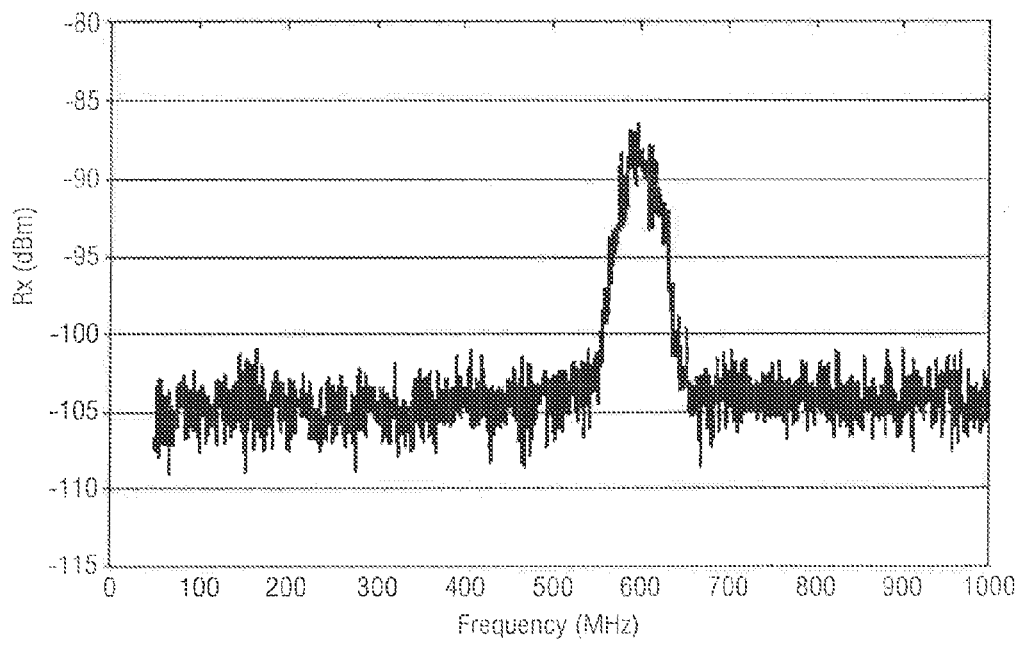
FIG. 7A illustrates an example plot of the noise floor characteristics when every channel in an example channel window has a modulation tone of the same frequency.
Figure 7B:
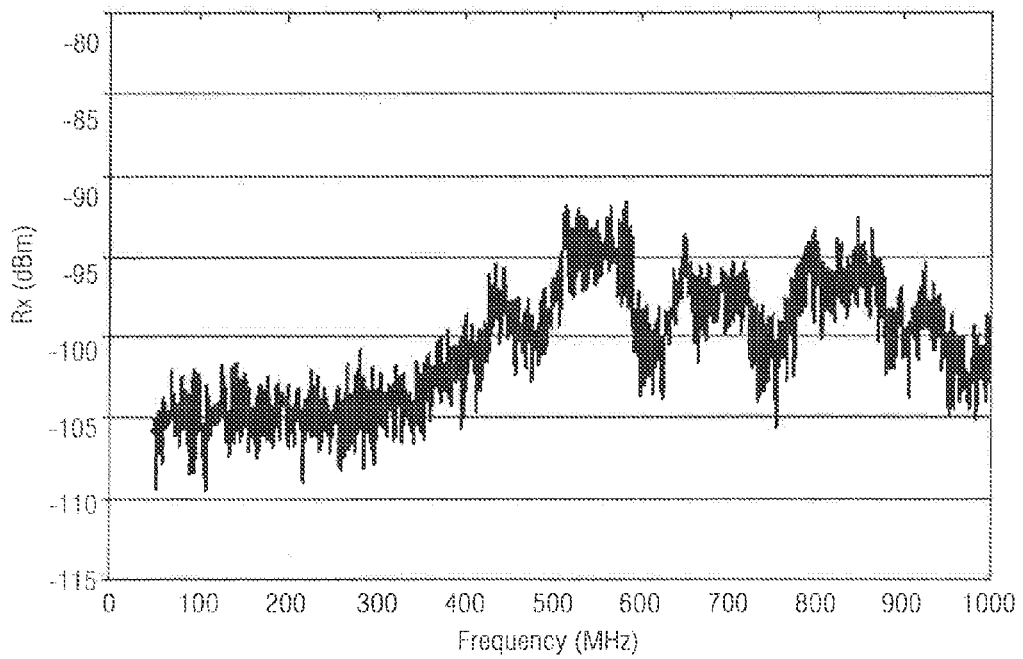
FIG. 7B illustrates an example plot of the noise floor characteristics of FIG. 7A when the modulation tones have different frequencies.

As explained above, teachings of certain embodiments recognize that using modulation tones of different frequencies may reduce or spread out noise. FIG. 7A illustrates an example plot 700A of the noise floor characteristics when every channel in an example channel window has a modulation tone of the same frequency. FIG. 7B illustrates an example plot 700B of the noise floor characteristics when the modulation tones have different frequencies. As can in plot 700A, noise accumulates at the same frequency (approximately 600 MHz in this example). In plot 700B, the noise from each FWM product is spread over a larger range of frequencies, resulting in a broader noise bandwidth and lower peak noise power density.

Figure 8:
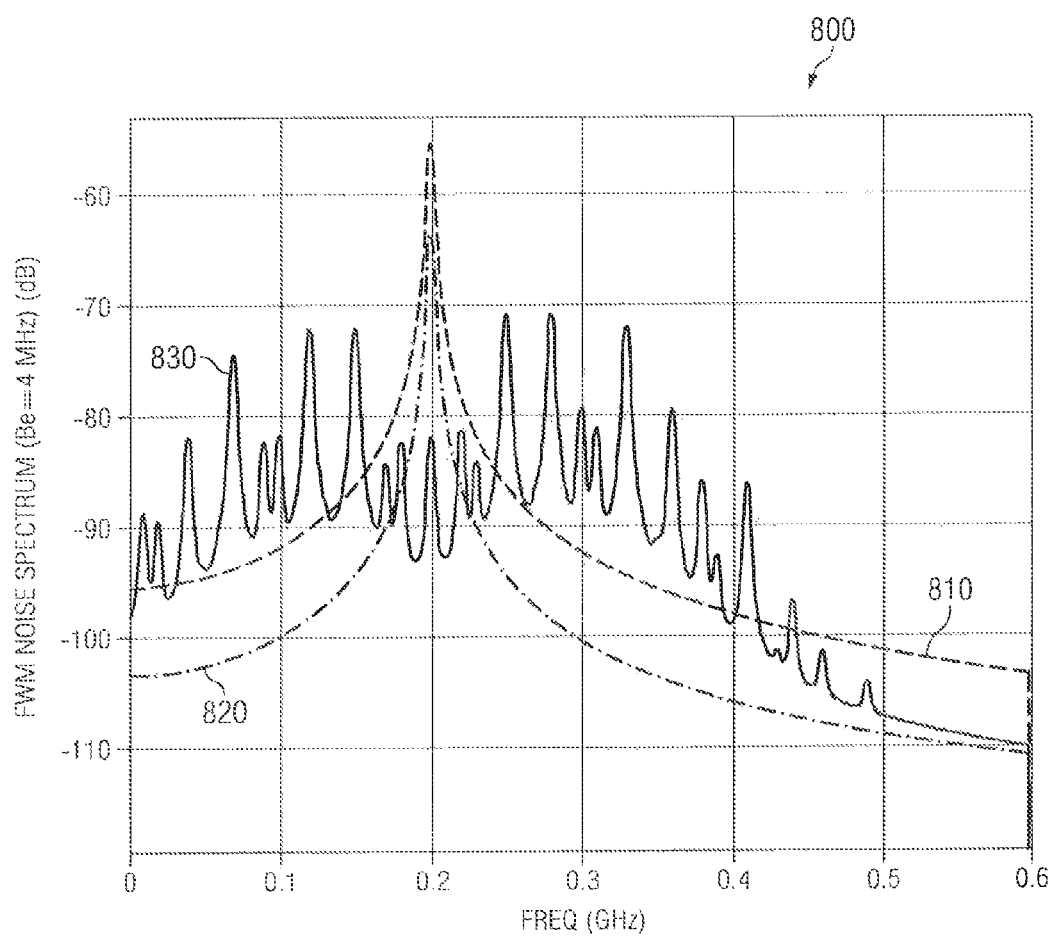
FIG. 8 illustrates an example plot of the noise spectrum within 600 MHz of channel B of FIGS. 7A and 7B for three difference scenarios.

FIG. 8 illustrates an example calculated plot 800 of the noise spectrum within 600 MHz of channel B for three difference scenarios. In this example, channels A, B, and C are spaced such that the FWM product $v_A+v_C-v_B$ is approximately 200 MHz from channel B.

Line 810 shows the noise spectrum near channel B when no modulation tones are applied to channels A, B, and C. Line 820 shows the noise spectrum near channel B when modulation tones of 2.00 GHz are applied to channels A, B, and C. In this example, applying modulation tones lowers the noise power at 200 MHz but results in the same sharp curve as line 810.

Line 830 shows the noise spectrum near channel B when a modulation tone of 2.05 GHz is applied to channel A, a modulation tone of 2.00 GHz is applied to channel B, and a modulation tone of 2.08 GHz is applied to channel C. In this example, applying modulation tones of different frequencies to channels A, B, and C effectively reduces the noise peak at 200 MHz and broadens the noise spectrum.

Figure 9:
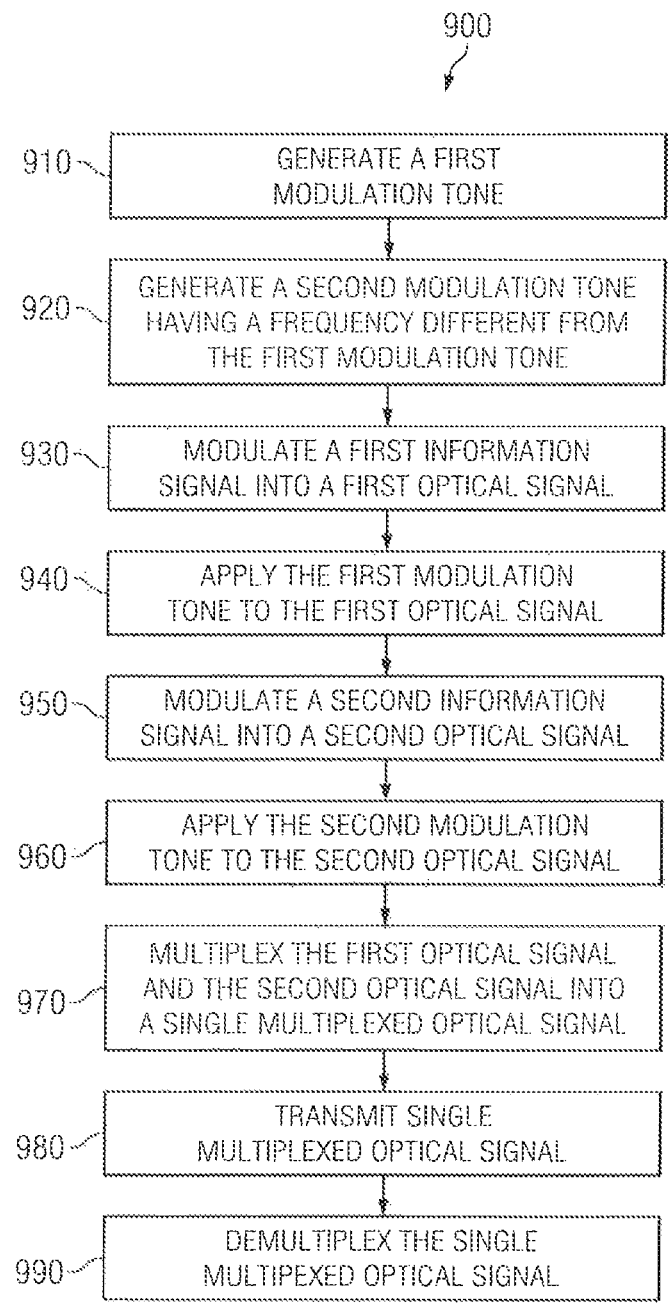
FIG. 9 illustrates an example method for transporting signals over a fiber optic network according to one embodiment.

FIG. 9 illustrates an example method 900 for transporting signals over a fiber optic network according to one embodiment. At step 910, a first modulation tone is generated. At step 920, a second modulation tone is generated. In this example, the second modulation tone has a frequency different from the first modulation tone. In some embodiments, tone generator 130 generates the first modulation tone and the second modulation tone.

At step 930, a first information signal is modulated into a first optical signal. In some embodiments, optical modulator 120 modulates the first information signal into the first optical signal. At step 940, the first modulation tone is applied to the first optical signal. In some embodiments, transmitter 100 applies the first modulation tone to the first optical signal to yield modulated optical signal 160.

At step 950, a second information signal is modulated into a second optical signal. In some embodiments, optical modulator 120 modulates the second information signal into the second optical signal. At step 960, the second modulation tone is applied to the second optical signal. In some embodiments, transmitter 100 applies the second modulation tone to the second optical signal to yield modulated optical signal 160.

At step 970, the first optical signal and the second optical signal are multiplexed into a single multiplexed optical signal. In some embodiments, wavelength multiplexer 220 multiplexes the first optical signal and the second optical signal into a single multiplexed optical signal. At step 980, the single multiplexed optical signal is transmitted over a fiber optic network. In some embodiments, the single multiplexed optical signal is transmitted over optical fiber 230. At step 990, the single multiplexed optical signal is demultiplexed. In some embodiments, wavelength de-multiplexer 240 demultiplexes the single multiplexed optical signals.

The steps of method 900 may be performed in any order and may be performed simultaneously. As one example, step 910 may be performed before, during, or after step 930. As another example, step 930 may be performed before, during, or after step 940.

The present disclosure encompasses all changes, substitutions, variations, alterations, and modifications to the example embodiments described herein that a person having ordinary skill in the art would comprehend. Similarly, where appropriate, the appended claims encompass all changes, substitutions, variations, alterations, and modifications to the example embodiments described herein that a person having ordinary skill in the art would comprehend.

What is claimed is:

1. A system comprising:
   at least one tone generator operable to generate a plurality of modulation tones comprising:
      a first modulation tone having a first modulation frequency; and
      a second modulation tone having a second modulation frequency that is different from the first modulation frequency;
   a plurality of transmitters operable to generate a plurality of modulated optical signals using the plurality of modulation tones and a plurality of information signals, each optical signal comprising a primary frequency, the plurality of modulated optical signals comprising:
      a first modulated optical signal generated using the first modulation tone; and
      a second modulated optical signal generated using the second modulation tone; and
   a wavelength multiplexer operable to multiplex the plurality of modulated optical signals into a single optical fiber;
   wherein:
      frequencies of a first plurality of four-wave mixing (FWM) products caused by the first modulation tone are at least a predefined distance away from any of the primary frequencies of the plurality of optical signals; and
      frequencies of a second plurality of FWM products caused by the second modulation tone are at least the predefined distance away from any of the primary frequencies of the plurality of optical signals.

2. The system of claim 1, wherein each of the first and second modulation frequencies are greater than the primary frequencies of the plurality of optical signals.

3. The system of claim 1, wherein the primary frequencies of the plurality of optical signals are spaced at one or more selected distances apart to reduce the ability of one or more FWM products caused by multiplexing the plurality of optical signals into a single fiber to interfere with any of the primary frequencies of the plurality of optical signals.

4. The system of claim 1, wherein the plurality of modulation tones are suppression tones operable to suppress effects from stimulated Brillouin scattering (SBS).

5. A method comprising:
   receiving a plurality of modulation tones from at least one tone generator, the plurality of modulation tones comprising:
      a first modulation tone having a first modulation frequency; and
      a second modulation tone having a second modulation frequency that is different from the first modulation frequency; and
   generating a plurality of modulated optical signals using the plurality of modulation tones and a plurality of information signals, each optical signal comprising a primary frequency, the plurality of modulated optical signals comprising:
      a first modulated optical signal generated using the first modulation tone; and
      a second modulated optical signal generated using the second modulation tone;
   wherein:
      frequencies of a first plurality of four-wave mixing (FWM) products caused by the first modulation tone are at least a predefined distance away from any of the primary frequencies of the plurality of optical signals; and
      frequencies of a second plurality of FWM products caused by the second modulation tone are at least the predefined distance away from any of the primary frequencies of the plurality of optical signals.

6. The method of claim 5, wherein the one or more FWM products comprises two-tone FWM products and three-tone FWM products.

7. The method of claim 5, further comprising multiplexing the plurality of modulated optical signals into a single optical fiber.

8. The method of claim 5, wherein each of the first and second modulation frequencies are greater than the primary frequencies of the plurality of optical signals.

9. The method of claim 5, wherein the primary frequencies of the plurality of optical signals are spaced at one or more selected distances apart to reduce the ability of one or more FWM products caused by multiplexing the plurality of optical signals into a single fiber to interfere with any of the primary frequencies of the plurality of optical signals.

10. The method of claim 5, wherein the plurality of modulation tones are suppression tones operable to suppress effects from stimulated Brillouin scattering (SBS).

11. A system comprising:
   at least one tone generator operable to generate a plurality of modulation tones comprising:
      a first modulation tone having a first modulation frequency; and
      a second modulation tone having a second modulation frequency that is different from the first modulation frequency; and
   a plurality of transmitters operable to generate a plurality of modulated optical signals using the plurality of modulation tones and a plurality of information signals, each optical signal comprising a primary frequency, the plurality of modulated optical signals comprising:
      a first modulated optical signal generated using the first modulation tone; and
      a second modulated optical signal generated using the second modulation tone;
   wherein:
      frequencies of a first plurality of four-wave mixing (FWM) products caused by the first modulation tone are at least a predefined distance away from any of the primary frequencies of the plurality of optical signals; and frequencies of a second plurality of FWM products caused by the second modulation tone are at least the predefined distance away from any of the primary frequencies of the plurality of optical signals.

12. The system of claim 11, wherein the one or more FWM products comprises two-tone FWM products and three-tone FWM products.

13. The system of claim 11, further comprising a wavelength multiplexer operable to multiplex the plurality of modulated optical signals into a single optical fiber.

14. The system of claim 11, wherein each of the first and second modulation frequencies are greater than the primary frequencies of the plurality of optical signals.

15. The system of claim 11, wherein the primary frequencies of the plurality of optical signals are spaced at one or more selected distances apart to reduce the ability of one or more FWM products caused by multiplexing the plurality of optical signals into a single fiber to interfere with any of the primary frequencies of the plurality of optical signals.

16. The system of claim 11, wherein the plurality of modulation tones are suppression tones operable to suppress effects from stimulated Brillouin scattering (SBS).

17. The system of claim 11, further comprising at least one dither generator operable to broaden the effective linewidth of the plurality of modulated optical signals by applying one or more dither signals.

18. The system of claim 1, wherein at least some of the plurality of modulated optical signals are unequally spaced.

19. The system of claim 1, wherein:

adjacent modulated optical signals are generated from modulation tones of different frequencies; and non-adjacent modulated optical signals are generated from one or more modulation tones of the same frequency.

\* \* \* \* \*